US009419430B1

(12) United States Patent
Tostrud et al.

(10) Patent No.: US 9,419,430 B1
(45) Date of Patent: Aug. 16, 2016

(54) SYSTEM FOR MONITORING AND MODELING OPERATION OF A TRANSFORMER

(75) Inventors: Mark D. Tostrud, Wauwatosa, WI (US); Peter G. Stewart, Victoria (AU); Ryan C. Ziegler, Butler, WI (US)

(73) Assignee: Dynamic Ratings Pty Ltd, Victoria (AU)

( * ) Notice: Subject to any disclaimer, the term of this patent is extended or adjusted under 35 U.S.C. 154(b) by 823 days.

(21) Appl. No.: 13/567,608

(22) Filed: Aug. 6, 2012

Related U.S. Application Data

(60) Provisional application No. 61/514,964, filed on Aug. 4, 2011.

(51) Int. Cl.
*H02H 6/00* (2006.01)
*G06Q 10/06* (2012.01)

(52) U.S. Cl.
CPC ........... *H02H 6/005* (2013.01); *G06Q 10/0635* (2013.01)

(58) Field of Classification Search
None
See application file for complete search history.

(56) References Cited

U.S. PATENT DOCUMENTS

| 3,601,689 | A | * | 8/1971 | Kettler .......................... 323/257 |
| 4,525,763 | A | * | 6/1985 | Hardy ................... G01R 31/343 318/472 |
| 5,838,881 | A | * | 11/1998 | Nelson et al. ..................... 706/2 |
| 6,446,027 | B1 | * | 9/2002 | O'Keeffe .............. G01R 31/02 702/181 |
| 8,116,916 | B1 | * | 2/2012 | Zeanah et al. ................. 700/291 |
| 2002/0161558 | A1 | * | 10/2002 | Georges et al. ............... 702/189 |
| 2004/0057491 | A1 | * | 3/2004 | Stenestam ....................... 374/29 |
| 2004/0167731 | A1 | * | 8/2004 | Wang ........................ H02J 3/00 702/60 |
| 2008/0294297 | A1 | * | 11/2008 | Bretzner ................ G05D 23/19 700/300 |
| 2009/0189617 | A1 | * | 7/2009 | Burns ...................... E21B 43/24 324/649 |
| 2009/0303761 | A1 | * | 12/2009 | Radbrant et al. ................. 363/51 |
| 2009/0312880 | A1 | * | 12/2009 | Venturini Cheim et al. .. 700/292 |
| 2009/0312881 | A1 | * | 12/2009 | Venturini Cheim et al. .. 700/292 |
| 2011/0050141 | A1 | * | 3/2011 | Yeh .......................... H02P 6/08 318/434 |
| 2012/0158325 | A1 | * | 6/2012 | Banerjee .............. G01R 31/027 702/58 |
| 2012/0218027 | A1 | * | 8/2012 | Ioannidis ....................... 327/513 |
| 2012/0218710 | A1 | * | 8/2012 | Ioannidis ....................... 361/697 |
| 2012/0221287 | A1 | * | 8/2012 | Ioannidis ....................... 702/132 |
| 2012/0221288 | A1 | * | 8/2012 | Ioannidis ....................... 702/136 |
| 2013/0158897 | A1 | * | 6/2013 | Jain ...................... G01R 31/027 702/42 |
| 2013/0243033 | A1 | * | 9/2013 | Asano, Jr. ....................... 374/152 |
| 2014/0039710 | A1 | * | 2/2014 | Carter .................... G06Q 10/06 700/291 |

FOREIGN PATENT DOCUMENTS

| CA | 2331565 | A1 | * | 11/1999 | ............. H02H 6/005 |
| CN | 201757682 | U | * | 3/2011 | |
| WO | WO 9960682 | A1 | * | 11/1999 | ............. H02H 6/005 |

* cited by examiner

*Primary Examiner* — Mohammad Ali
*Assistant Examiner* — Kelvin Booker
(74) *Attorney, Agent, or Firm* — Boyle Fredrickson, S.C.

(57) ABSTRACT

A system and method for assessing and modeling operation of a transformer includes a controller connected to a power transformer. The controller is configured to calculate theoretical information related to operation of the power transformer, assess information related to actual operation of the power transformer, and manipulate one of more parameters associated with one or more equations used to calculate the theoretical information so that the calculated theoretical information more closely approximates the information associated with the actual operation of the power transformer. In a preferred embodiment, the controller is configured to automatically manipulate the parameters associated the theoretical calculation of operation of the power transformer although the controller may also be configured to request user confirmation of manipulation of one or more of the parameters of the equations associated with the theoretical calculations related of expected actual operation of the power transformer.

20 Claims, 3 Drawing Sheets

SYSTEM FOR MONITORING AND MODELING OPERATION OF A TRANSFORMER

CROSS REFERENCE TO RELATED PATENT APPLICATIONS

This application is a non-provisional patent application and claims priority to U.S. Provisional Patent Application Ser. No. 61/514,964 filed on Aug. 4, 2011 titled "Auto-Tune Transformer Temperature Monitor" and the disclosure of which is expressly incorporated herein.

BACKGROUND AND SUMMARY OF THE INVENTION

Electrical transformers commonly transfer electrical energy from one electrical circuit to another electrical circuit through inductively coupled conductors or coils. Such transformers commonly include one or more conductive coils that are maintained in proximity to one another such that electrical power can be input through a primary or first coil and generates electrical output power in a secondary, adjacent, or second coil. A varying current in the first or primary winding or coil creates a varying magnetic flux in a core and thereby a varying magnetic field in a second winding or coil. The varying magnetic field induces an electromotive force in the secondary coil thereby inducing the electrical output voltage. Such electrical transformers perform many power manipulation processes in many industrial, commercial, and residential applications.

Desired operation of such transformers relies heavily on proper operation of the respective windings associated with the primary and second coils. Temperature deviations and thermal localizations associated with either of the primary or secondary windings can adversely affect the ability of the respective coils to conduct the input and/or output electrical power associated with the respective coil. Left unaddressed, such deviations can result in failure of the respective coil and/or ultimate failure of the transformer. Due at least in part to the voltage potentials common in such transformers, indirect measurement methods are commonly used to calculate winding temperatures as well as assessing and determining winding temperature hot-spots. Exemplary equations associated with determining winding and winding hot-spot temperatures can be found in IEEE standards C57.91, C57-119, IEEE-1538, and IEC 60076. Such equations utilize various variables associated with operation of a transformer such as one or both of a top oil temperature, a bottom oil temperature, and power transfer design parameters—such as winding ratios; conductor sizes, etc. to determine the target winding and winding hot-spot temperatures associated with intended operation of specific transformer configurations. However, the temperature of the transformer winding is not uniform and the hottest section of the winding is commonly called the winding hot spot.

An accurate model of the transformer's thermal performance is needed to simulate how the transformer will respond in power applications during operation of the transformer. As part of acceptance testing on new units, the temperature of the respective windings is measured to demonstrate that the average winding temperature will not exceed the acceptable limits as defined by various industry standards associated with the intended use of the transformer. The accuracy of the temperature calculations varies as a function of the accuracy of the information provided as well as a correlation between the ability of the mathematical model to simulate the thermal performance of a particular transformer.

In addition to the mathematical modeling discussed above, more advanced transformer monitoring systems can also calculate intermediate oil temperatures at locations in the transformer based on intended transformer operating conditions along with transformer design parameters. The winding hot-spot temperature of a transformer is an important value to monitor in order to safely operate and manage operation of a given transformer. Additionally, transformer life depends on the life of the insulating material in the transformer, and the life of the insulating material depends on the temperatures to which it is exposed.

When designing new transformers, engineers utilize theoretical parameters to calculate loss data and model the thermal performance of the transformer. The various parameters cannot be proved until the transformer is tested. The equations used to determine the winding and winding hot-spot temperatures can be found in the IEEE standards C57.91, C57-119, IEEE-1538 and IEC 60076-7. These equations utilize top oil temperature or bottom oil temperature along with other transformer design parameters to determine the winding and winding hot-spot temperatures. The accuracy of these calculated temperatures varies depending on the accuracy of the information provided and how well the model simulates the thermal performance of the transformer.

In addition to calculating the winding and winding hot spot temperatures, advanced transformer monitoring systems also calculate oil temperatures in various locations in the transformer. Similar to calculating winding and winding hot spot temperatures, transformer oil temperature calculations are based on environmental and transformer operating conditions along with the transformer design parameters as expressed as equation variables. Comparing the measured oil temperatures to the theoretical calculated oil temperatures can provide confirmation of the equation variables and creates a more accurate model of the thermal performance of the transformer.

Alternatively, direct methods of winding temperature and winding hot-spot measurement can be employed to compare the measured temperatures to the calculated values. Direct winding temperature measurement also provides a confirmation of the equation variables and helps create a more accurate model of the transformer.

The present invention utilizes advanced monitoring systems to automate both confirmation of the transformer parameters as well as the equation variables. The optimization software can automatically adjust the transformer parameters and equation variables to improve the model results such that the mathematical model more accurately reflects actual operation of the transformer. Alternatively, a transformer monitoring system according to the present invention can request an operator recommendation as to allowing or denying revisions to the model variables to improve the model results. As another alternative, the monitoring system can be configured to automatically manipulate one or more of the variables associated with the model equations in response to one or more monitored parameters, thereby automatically "tuning" the control parameters to create a more accurate model and thereby increasing the ability to predict performance of both existing and new power transformer systems.

One aspect of the invention contemplates a power transformer control system that includes a processor that is connected to a random access memory device and configured to be connected to a transformer. At least one sensor is connected to the processor and configured to detect a value, such as temperature or electrical parameters, associated with operation of the transformer. At least one mathematical model associated with operation of the transformer is stored on the random access memory device. The processor is configured to solve at least one mathematical model and compare a calculated value achieved by solving the at least one mathematical model to the detected value. The processor is configured to manipulate at least one parameter in the mathematical model if the calculated value and the detected value are beyond an acceptable range or desired respective limit. The processor can be configured to automatically manipulate the mathematical model or request user confirmation of the desired manipulation.

Another aspect of the invention contemplates a method for assessing operation of a power transformer. The method includes calculating theoretical winding temperatures of a transformer and measuring actual winding temperatures associated with operation of the transformer. The calculated theoretical winding temperature and the measured winding temperatures are then compared and a difference, if any, is determined between a calculated winding temperature and a measured winding temperature. A change, if any, is calculated for at least one of a hot spot factor, a winding exponent, and a winding time constant so that the calculated theoretical winding temperature approaches the measured winding temperature to improve a mathematical model associated with determining the thermal performance of the transformer.

Another aspect of the invention contemplates a method for calculating the thermal characteristics in a power transformer. A theoretical oil temperature associated with operation of the power transformer is calculated and actual oil temperatures are measured during operation of the power transformer. A difference between the calculated and the measured oil temperatures and a temperature time error is calculated between a calculated and a measured time of minimum and/or maximum oil temperatures is reduced by changes to at least one of oil rise values, oil exponents, oil time constants, and equation variables associated with calculating the theoretical oil temperature to get the at least one of the calculated error and the temperature time error to approach zero.

Another aspect of the invention contemplates a method for comparing the time at which a temperature will occur based on the mathematical model versus the time at which a measured temperature occurs in a power transformer. The difference between the time of the calculated and measured temperatures is reduced by changes to at least one of oil rise values, oil exponents, oil time constants, and equation variables associated with calculating the theoretical oil temperature.

These and various other aspects, features, and advantages of the present invention will be made apparent from the following detailed description and the drawings.

BRIEF DESCRIPTION OF THE DRAWINGS

The drawings illustrate one preferred embodiment presently contemplated for carrying out the invention.

In the drawings.

DETAILED DESCRIPTION

Figure 1:
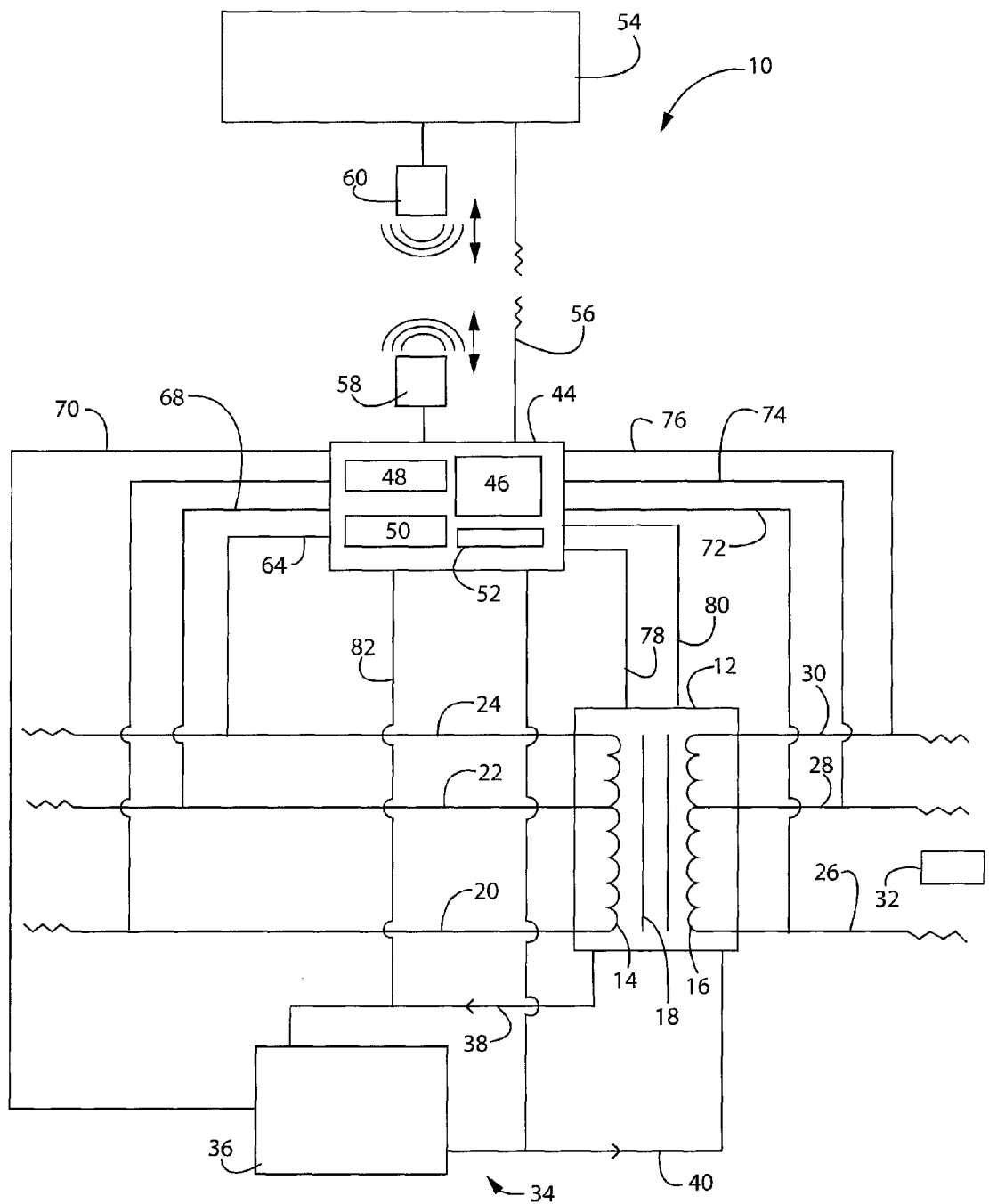
FIG. 1 is a schematic representation of a power transformer system equipped with a control system according to the present invention.

Referring to FIG. 1, a transformer power system 10 includes a transformer 12 having a power or input coil 14 that is inductively coupled to an output or load coil 16 by an inductive core 18. Each of input coil 14 and output coil 16 can include one or more taps 20, 22, 24, 26, 28, 30 arranged to transfer electrical power between input coil 14 and output coil 16 via the inductive relationship between each coil 14, 16 and core 18. A load 32 is connected to one or more of taps 26, 28, 30 associated with output coil 16 such that the desired electrical power can be supplied to load 32 from the input power supplied to to transformer 12 via taps 20, 22, 24 associated with input coil 14. Transformer 12 is configured to communicate with a cooling system 34 which may include an optional heatsink 36 associated with circulating a cooling fluid, such as oil, via one or more circulation lines 38, 40. It is further appreciated that transformer 12 may include one or more volumes of oil associated with maintaining a desired operating temperature of transformer 12, coil 14, and/or coil 16.

Transformer power system 10 includes a control system 44 that is configured to monitor and possibly manipulate operation of transformer 12. Control system 44 includes a display 46, a processor 48, a random access memory 50, and can include one or more inputs 52 configured to allow user interaction with one or more of processor 48 and/or random-access memory 50. An optional computer system 54 can be connected to processor 44 via a permanent wired connection 56 or a wireless communication interface that includes one or more wireless communication modules 58, 60 configured to allow wireless communication between processor 44 and supplemental control systems such as computer 54. It is appreciated that processor 44 and/or computer 54 can be configured to allow operation and/or monitoring of one or more transformers 12. It is further appreciated that although processor 44 and computer 54 are shown as separate devices, the functionality of such devices can be integrated into a single unitary device. It is further appreciated that processor 44 and/or computer 54 can be positioned proximate transformer 12 and/or remote therefrom. Regardless of the specific configuration and/or location, processor 44 and/or computer 54 are configured to allow user interaction, monitoring, and/or manipulation of the various systems associated with the operation of transformer 12.

Processor 48 can be configured to receive and/or communicate instructions to one or more connections 64, 66, and 68 associated with input coil 14, connections 72, 74, and 76 associated with output coil 16, connections 78 and 80 associated with transformer 12, and/or connections 70 and 82 associated with oil system 36. It should be appreciated that the various connections described above are merely exemplary of various connections usable for assessing the electrical and thermal operation of transformer 12 of power system 10. Commonly, one or more of connections 70, 78, 80, and 82 are associated with thermal sensors, such as thermocouples, associated with monitoring the temperature performance associated with operation of transformer 12, coils 14, 16, and/or oil cooling system 36. It is appreciated that one or more of the various connections discussed above could be configured to wirelessly communicate with processor 48 of control system 44 and/or computer 54 in a manner similar to the communication system associated with transmitters/receivers 58, 60 disposed between control system 44 and computer 54. It is further appreciated that the graphical representation of power system 10 is merely exemplary of one such transformer based power system useable with the control system 44 of the present invention.

As described below with respect to FIGS. 1-3, processor 48 may be configured to communicate with random-access memory 50 to allow manipulation of various equations that provide a model as to the desired or expected operation of transformer 12. Representatively, processor 48 is configured to manipulate one or more parameters, variables, or values; such as oil temperature rise, oil rise values, oil exponents, time constants, tap positions, ambient temperature conditions, date and time of oil minimum and/or maximum temperatures; used to provide the mathematical equations associated with providing a model of expected actual operation of transformer 12. Representatively, processor 48 preferably manipulates the parameters associated with the various mathematical models automatically in response to deviations between measured values with respect to the calculated model values. Alternatively, control system 44 can be configured to require user confirmation and/or acceptance of one or more changes associated with manipulation of the model equations so as to "tune" or adjust the mathematical model associated with estimating the desired operation of transformer 12 so that the mathematically calculated model of operation of a transformer more closely correlates to actual operation of a given transformer.

As described further below with respect to FIGS. 2 and 3, the method of operation of control system 44 acquires various information associated with operation of a given transformer configuration; such as loss information, time constants, oil temperature exponents; winding and materials, and other transformer parameters from a configuration file that includes information specific to the configuration and/or construction of transformer 12, cooling system 36, power system 10, and/or ambient conditions. Control system 44 can further be configured to acquire initial values for oil rise, oil exponents and/or oil time constants. The method then measures use or operation information such as tap positions and/or actual oil temperatures associated with operation of transformer 12. The method calculates or models the expected oil temperatures, utilizing theoretical mathematical transformer parameters from the initial information and the equation variables associated with the physical configuration of the power system. The various temperatures, winding, and oil information are calculated utilizing equations from standards such as IEEE standard C57-91, IEC 600076, and Dynamic Ratings DRMCC-E3 4, for example. Understandably, other standards may be utilized to provide a model associated with the expected operation of a particular transformer associated with power system 10.

The method then compares the calculated model information to actual measured information to assess the accuracy of performance of the power system relative to the modeled expectation of operation of the system. For instance, controller 44 can be configured to calculate the error between the various calculated and measured oil temperature values, the date and time of minimum and/or maximum oil temperatures, as well as winding and winding hotspot temperatures and dates and times associated with the same. Representatively, if the difference exceeds an allowable or tolerable limit, controller 44 can be configured to change one or more of the values associated with the mathematical model, such as an oil rise value, a time constant, and/or oil exponents as needed so that the thermal characteristics of the transformer, as determined by the mathematical models, more accurately reflect the measured transformer performance when the measured values are within tolerable operational limits.

Controller 44 can further be configured to manipulate the mathematical model of the performance of the transformer as a function of calculated and measured oil temperatures. As explained further below with respect to FIG. 2, if an actual date and time of the transformer's minimum and/or maximum oil temperature deviates beyond an acceptable or tolerable threshold or limit relative to a theoretical date and time of the minimum and/or maximum oil temperature based on the calculations using transformer parameters, values of the mathematical model, such as an oil time constant can be incremented such that the date and time of actual minimum and/or maximum oil temperature more closely resembles the actual measured date and time of minimum and/or maximum oil temperatures as well. Controller 44 can record or report these oil temperature dates and times associated with the prescribed oil exponents and oil time constants so that the date and time of modeled minimum and/or maximum oil temperatures more accurately reflect actual date and time of minimum and/or maximum oil temperature as assessed during operation of the transformer while maintaining operability of the transformer within suitable operational limits as determined by the configuration of the power system. As such, controller 44 is configured to create a more accurate model of the transformer oil characteristics as well as a more accurate model of the winding and winding hot spot behavior.

Figure 2:
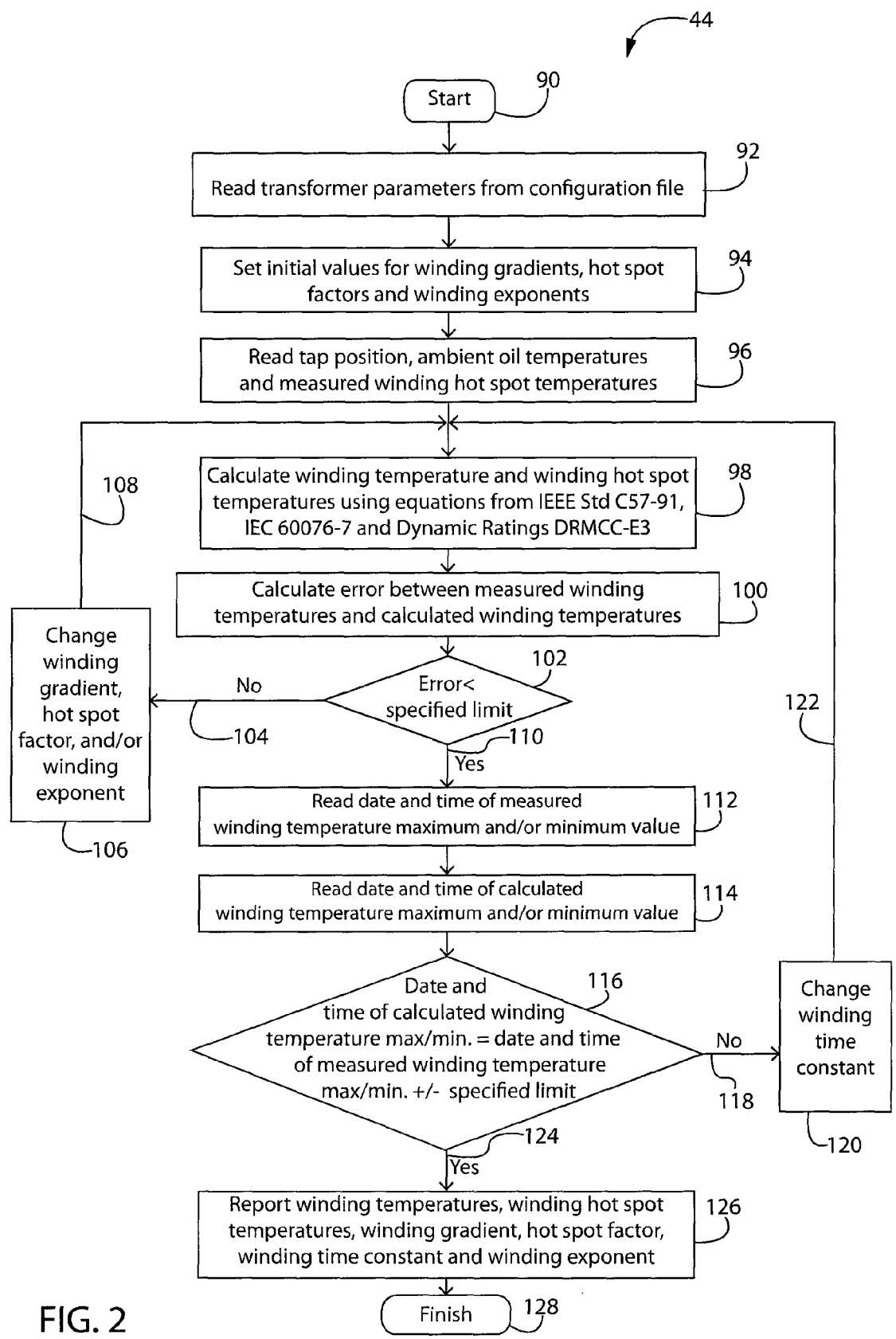
FIG. 2 is a flow diagram of a winding temperature operational sequence of the control system shown in FIG. 1.

Referring to FIGS. 1 and 2, an exemplary configuration of the operation of control system 44 includes an initialization 90 of control system 44. During initialization of control system 44, processor 48 acquires various parameters 92, such as hotspot factors and/or winding time constants, from a configuration file that may be externally provided and/or was previously stored on RAM 50 and/or computer 54. Processor 48 at step 94 sets the initial values associated with the winding gradients and at step 96 assesses the tap position, ambient oil temperatures, and/or measured winding hotspot temperature with the mathematically modeled operation of transformer 12. Processor 48 proceeds at step 98 to calculate winding temperatures and winding hotspot temperatures using various transformer mathematical modeling equations such as IEEE standard C57-91, IEC standard 600076, and/or Dynamic Ratings standards DRMCC-E3.

Processor 48 proceeds at step 100 to calculate the difference or error between the measured winding temperatures and the calculated winding temperatures. At decision 102, processor 48 determines whether an average error between the calculated operating values compared to the measured values is within an acceptable limit, such as less than approximately 0.5° C. or 0.9° F. If the average error is greater than the desired limit 104, processor 48 can be configured to automatically change the hotspot factor and/or the winding exponent 106 and/or configured to request user authorization to do so via inputs 52 (FIG. 1). Upon such an incremental adjustment 106, 108, processor 48 reiterates steps 98, 100, 102 until an average error between the modeled and measured values yields a result that is within a tolerable limit 110. Upon an acceptable error limit 110, processor 48 next assesses a date and time associated with a measured winding temperature minimum and/or maximum value 112 and can proceed to calculate and/or read (such as from RAM 50) a date and time associated with a calculated or modeled winding minimum and/or maximum temperature 114.

Processor 48 compares the date and time of calculated and measured winding temperature minimum and/or maximum values 116 and assesses the value of the comparison with respect to a suitable limit, such as the calculated and measured minimum and/or maximum winding temperature dates and times being within an acceptable time frame of one other. If comparison 116 yields a result beyond the desired limit 118, processor 48 increments, or requests user permission to increment, a winding time constant 120 and again returns to calculate the various variables and/or parameters associated with the model operational values at step 98. When the average error is within a tolerable limit 110 and/or the date and time of the calculated and measured winding temperature minimum and/or maximum values are within a tolerable limit 124, processor 48 can be configured to record and/or report winding temperatures, winding hotspot temperatures, winding gradients, hotspot factors, winding time constant, and/or winding exponents at step 126. Understandably, such reporting may be performed via display 46, communication with computer 54, and/or via communication with RAM 50. The sequence associated with FIG. 2 terminates 128 when the equations associated with the mathematical modeling or calculations associated with operation of transformer 12 provide sufficient repeatability to be indicative of actual operation of transformer 12 under the proscribed ambient conditions and respective construction of power system 10. It is further envisioned that the process shown in FIG. 2 can be repeated as desired, such as at periodic time intervals, upon changes in ambient or operating conditions, etc. to provide further tuning of the various equations associated with modeling operation of the power system to more accurately reflect actual operation of the power system during deviations of the ambient conditions.

Figure 3:
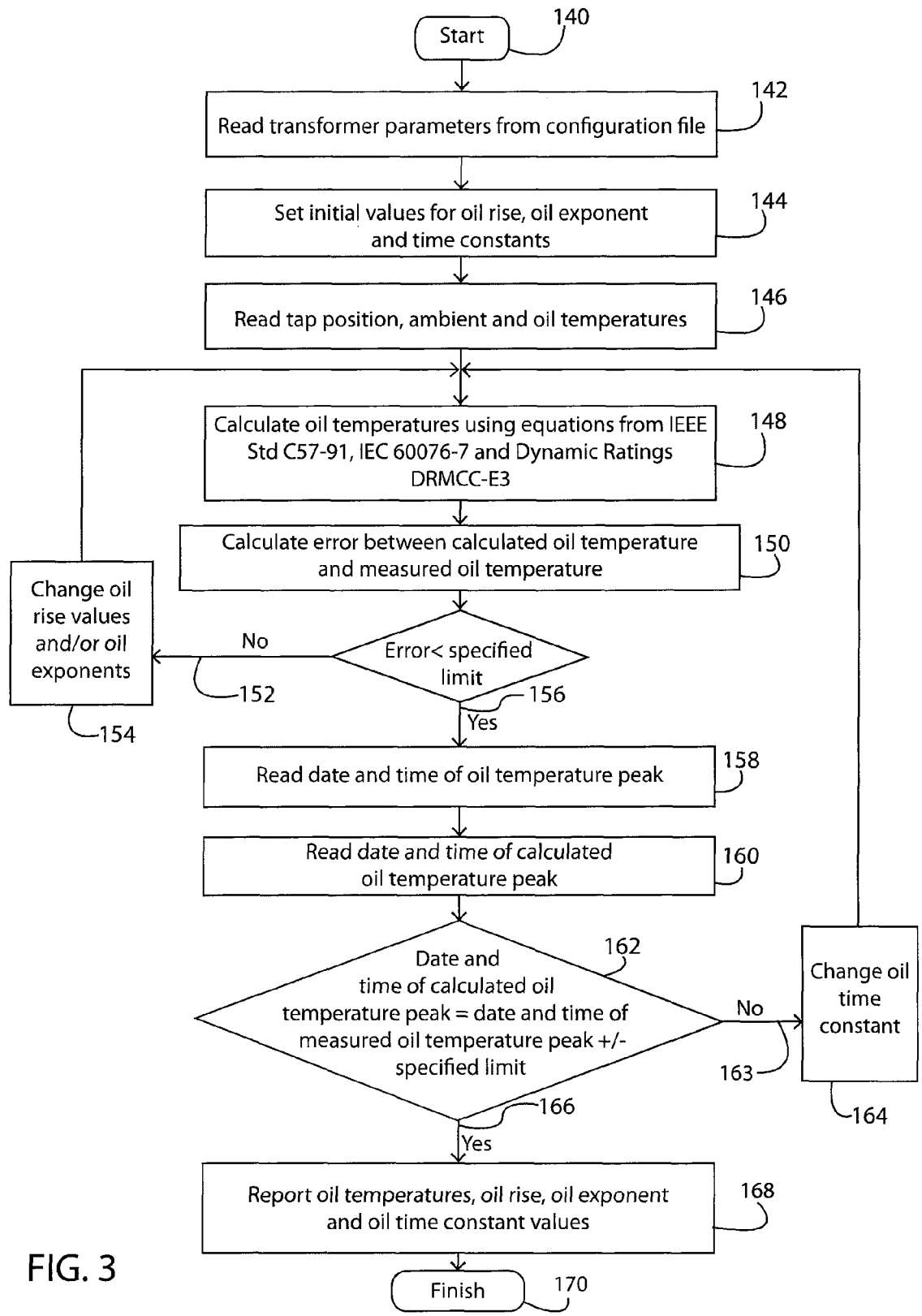
FIG. 3 is a flow diagram of an oil temperature operational sequence of the control system shown in FIG. 1.

Referring now to FIGS. 1 and 3, controller 44 can also be configured to assess the discrete performance of the windings or coils associated with transformer 12. Winding condition assessment starts 140 by reading transformer parameters and equation variables; such as loss information, time constants and exponents, etc.; from a configuration file 142 that may be externally provided or provided via RAM 50 and/or computer 54 and are specific to the transformer and/or power system whose model and actual operation are being assessed. Initial modeled values for parameters such as the oil rise are then set 144. Controller 44 then assesses various parameters or values associated with the tap position, ambient temperatures, and top and bottom location oil temperatures 146. Controller 44 then calculates oil temperatures 148 from the theoretical parameters and values acquired at 142 via utilization of various model value equations such as IEEE standard C57-91, IEC standard 600076, and/or Dynamic Ratings standard DRMCC-E3.

Controller 44 then compares the calculated model value and operational information to calculate the difference or error between the calculated and measured oil temperatures 150. If the error is above a desired threshold or limit 152, such as 0.5° C. or 0.9° F. for example, controller 44 changes one or more parameters 154, such as oil rise value, time constant, and/or an oil exponent, either automatically or upon authorization from a user, and reassess the model data information 148 until the error is within a desired threshold or limit 156. It should be appreciated that manipulation of the model data in such a manner drives the error between the model values and the actual values toward a zero error. That is, the parameters and variables associated with the model are changed as needed to so that the thermal characteristics of the transformer calculated from the information in the configurations or model file more accurately reflect the measured transformer performance.

If the error is within a tolerable or allowable limit 156, control system 44 acquires actual transformer minimum and/or maximum winding temperature date and time information 158, calculates a theoretical transformer minimum and/or maximum winding temperature date and time 160 and compares the measured and detected information 162. If the modeled calculated oil temperature time 160 is outside an acceptable limit 163, relative to the measured oil temperature time 160, control system 44 increments the oil time constant associated with the model calculation 164 and repeats the sequence of calculating the model oil temperature 148 and time of minimum and/or maximum oil temperature 158, 160 until both the percent error between the calculated oil temperature and the measured oil temperature and the time to minimum and/or maximum oil temperature are within acceptable or tolerable limits 166 such that the model transformer operation calculation closely mimics the actual operational parameters associated with the desired operation of transformer 12.

Control system 44 is further configured to record and/or report 168 the adjusted oil temperatures, oil rise, oil exponents, and oil time constant values into the configuration file prior to completion 170 of the oil temperature model/actual comparisons such that the adjusted model equations are available for subsequent operation and/or configuration of transformer 12 at 142. Manipulating the parameters used to generate the mathematical equations associated with the transformer model information in such a manner allows the operation of a transformer to be quickly assessed and expedites configuration of the oil system of a given transformer for operation under a variety of differing ambient conditions.

It is appreciated that the system and methods of the present invention may be utilized in testing new transformers to create an accurate model of transformer winding, hotspot, and oil system thermal performance and transformer life before implementing the transformer into a power application. The method may also be utilized on an existing transformer to create a more accurate model the transformer's thermal performance, transformer life, and for troubleshooting and/or service requirement activities. It is further appreciated that additional and/or different standards and/or equations or transformer performance mathematical models beyond the specific standards discussed herein may be used to model and calculate transformer performance including thermal and/or power operating characteristics of discrete or multiple power transformers.

Therefore, one embodiment of the invention includes a power transformer control system that includes a processor that is connected to a random access memory device and configured to be connected to a transformer. At least one sensor is connected to the processor and configured to detect a value associated with operation of the transformer. At least one mathematical model associated with operation of transformer is stored on the random access memory device. The processor is configured to solve the at least one mathematical model and compare a calculated value achieved by solving the at least one mathematical model to the detected value. The processor is configured to manipulate at least one parameter in the mathematical model if the calculated value and the detected value are beyond an acceptable range or desired respective limit. The processor can be configured to automatically manipulate operation the mathematical model and/or request user confirmation of the desired manipulation.

Another embodiment of the invention includes a method for assessing operation of a power transformer. The method includes calculating theoretical winding temperatures of a transformer and measuring winding temperatures associated with operation of the transformer. The calculated theoretical winding temperature and the measured winding temperatures are then compared and a difference, if any, is determined between a calculated minimum and/or maximum winding temperature and a measured minimum and/or maximum winding temperature. A change, if any, is calculated for at least one of a hot spot factor and a winding exponent, and a winding time constant so that the calculated theoretical winding temperature approaches the measured winding temperature to improve a mathematical model associated with determining the thermal performance of the transformer.

Another embodiment of the invention includes a method for calculating the thermal characteristics in a power transformer. A theoretical oil temperature associated with operation of the power transformer is calculated and actual oil temperatures are collected during operation of the power transformer. An error is calculated between the calculated and the measured oil temperatures and a temperature time error is calculated between a calculated and a measured time of minimum and/or maximum oil temperature. The method calculates a change required, if any, to at least one of oil rise values, oil exponents, oil time constants, and equation variables associated with calculating the theoretical oil temperature to get the calculated error and the temperature time error to approach zero.

The present invention has been described in terms of the preferred embodiment, and it is recognized that equivalents, alternatives, and modifications, aside from those expressly stated, are possible and within the scope of the appending claims.

What is claimed is:

1. A method for calculating the thermal characteristics in a power transformer, the method comprising:
   executing a mathematical model for determining a thermal performance of a power transformer, the mathematical model including a plurality of variables;
   calculating a theoretical oil temperature associated with operation of the power transformer at a first time by executing the mathematical model;
   collecting an actual oil temperature during operation of the power transformer at a second time;
   calculating a temperature error between the calculated and the collected oil temperatures;
   calculating a time error between the first and second times; and
   determining a difference between a limit and at least one of the temperature error and the time error and, if at least one of the differences is greater than the limit, calculating a change in a variable of the mathematical model, the variable representing at least one of an oil rise value, an oil exponent, and an oil time constant associated with calculating the theoretical oil temperature, and repeating the steps of executing the mathematical model using the changed variable, calculating the theoretical oil temperature associated with operation of the power transformer at a subsequent first time by executing the mathematical model, calculating the temperature error between the calculated and the collected oil temperatures, calculating a time error between the subsequent first time and a subsequent second time, and determining the difference between the limit and at least one of the temperature error and the time error until the difference is within the limit.

2. The method of claim 1, further comprising automatically changing at least one of the oil rise value, the oil exponent, and the oil time constant if the temperature error and the time error are beyond a limit, respectively.

3. The method of claim 2, further comprising collecting a plurality of actual oil temperatures, wherein collecting the actual oil temperatures includes taking multiple temperatures at different locations of the transformer.

4. The method of claim 3, further comprising determining a coil hot spot temperature.

5. The method of claim 1, further comprising displaying at least one of the calculated change required in the at least one of the oil rise value, oil exponent, oil time constant and equation variable to allow a manual incremental adjustment of the respective at least one of the oil rise value, oil exponent, oil time constant, and equation variable.

6. The method of claim 1 further comprising connecting a controller to the power transformer, the controller being configured to calculate the theoretical oil temperature, receive data indicative of the actual oil temperatures and automatically manipulate at least one parameter of an equation associated with calculating the theoretical oil temperature when the actual oil temperature differs beyond a limit from the actual oil temperature.

7. The method of claim 6 further comprising communicating information between the controller and a computer.

8. A method for assessing operation of a power transformer, the method comprising:
   executing a mathematical model for determining a thermal performance of a transformer, the mathematical model including a plurality of variables;
   calculating a theoretical winding temperature of a transformer by executing the mathematical model;
   measuring a winding temperature associated with operation of the transformer;
   comparing the calculated theoretical winding temperature and the measured winding temperature;
   determining a difference between the calculated winding temperature and the measured winding temperature; and
   determining whether a difference between the calculated winding temperature and the measured winding temperature is beyond a limit and, if so, calculating a change of a variable of the mathematical model, the variable representing at least one of a hot spot factor, a winding exponent, and a winding time constant; and
   repeating the step of calculating the theoretical winding temperature of the transformer by executing the mathematical model using the changed variable and comparing the calculated theoretical winding temperature and the measured winding temperature until the difference between the calculated theoretical winding temperature and the measured winding temperature is within the limit.

9. The method of claim 8, further comprising automatically adjusting at least one of the hot spot factor, the winding exponent, and the winding time constant used to calculate the theoretical winding temperature in response to the calculated change.

10. The method of claim 8, further comprising displaying the calculated change to an operator.

11. The method of claim 8, further comprising calculating, measuring, comparing, and, if applicable, changing at least one hot spot model constant to reduce the difference between the calculated theoretical winding temperature and the measured winding temperature so that model values approach measured values acquired during operation of the transformer.

12. The method of claim 8, wherein measuring winding temperatures associated with operation of the transformer further comprises communicating a signal from a fiber optic sensor positioned to measure at least one of the winding temperature and a winding hot spot temperature for use, if any, in determining the difference to the modeled transformer thermal performance.

13. A transformer control system comprising:
   a processor connected to a memory device in a system configured to be connected to a transformer;
   at least one sensor connected to the processor and configured to detect a value associated with operation of the transformer; and at least one mathematical model for determining a thermal performance of a transformer, the at least one mathematical model including a plurality of variables, the at least one mathematical model stored on the memory device;

wherein the processor is configured to communicate with the memory device to:
(a) execute the at least one mathematical model;
(b) calculate a first value by executing the at least one mathematical model;
(c) compare the calculated first value to the detected value to determine a difference;
(d) determine whether the difference between the calculated first value and the detected value is beyond a limit and, if so, modify a variable of the at least one mathematical model, and repeat steps (a), (b) and (c) using the modified variable to calculate a second value closer to the detected value than the calculated first value until the calculated second value is within the limit.

14. The transformer control system of claim 13 wherein the detected value is a temperature associated with operation of the transformer.

15. The transformer control system of claim 14 wherein the temperature associated with operation of the transformer is further defined as one of a winding hot spot temperature or a top oil temperature.

16. The transformer control system of claim 13 wherein the detected value is an electrical parameter associated with at least one of a feed power signal and a load power signal acquired during operation of the transformer.

17. The transformer control system of claim 13 wherein the sensor is further defined as one of a thermocouple or a resistance temperature detector (RTD).

18. The transformer control system of claim 13 wherein the processor is further configured to request user authorization prior to manipulation of at the least one mathematical model.

19. The transformer control system of claim 18 further comprising a computer configured to communicate with the processor and allow manipulation of the at least one mathematical model.

20. The transformer control system of claim 19 wherein the processor is configured to wirelessly communicate with the computer.

* * * * *